US010616640B2

(12) United States Patent
Chaudhari et al.

(10) Patent No.: US 10,616,640 B2
(45) Date of Patent: Apr. 7, 2020

(54) OVER THE TOP MEDIA INTEGRATION WITH OVER THE AIR BROADCAST MEDIA

(71) Applicant: Sling TV L.L.C., Englewood, CO (US)

(72) Inventors: Jimshade Chaudhari, Highlands Ranch, CO (US); Joseph Puccio, Seattle, WA (US); James Burke O'Brien, IV, Englewood, CO (US); David London, Denver, CO (US); Trent A Badger, Orem, UT (US); James Kim, Redwood City, CA (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 15/856,705

(22) Filed: Dec. 28, 2017

(65) Prior Publication Data
US 2019/0208259 A1 Jul. 4, 2019

(51) Int. Cl.
*H04N 21/433* (2011.01)
*H04N 21/462* (2011.01)
(Continued)

(52) U.S. Cl.
CPC ....... *H04N 21/4334* (2013.01); *G11B 27/105* (2013.01); *H04N 5/44543* (2013.01);
(Continued)

(58) Field of Classification Search
CPC ......... H04N 21/4334; H04N 21/47214; H04N 21/482
See application file for complete search history.

(56) References Cited

U.S. PATENT DOCUMENTS

| 6,985,190 B1 * | 1/2006 | Klopfenstein ........... H04N 5/50 |
| | | 348/569 |
| 7,818,444 B2 | 10/2010 | Brueck et al. |

(Continued)

FOREIGN PATENT DOCUMENTS

| EP | 2823405 A2 | 1/2015 |
| EP | 3 300 355 A1 | 3/2018 |

(Continued)

OTHER PUBLICATIONS

Supplementary European Search Report for EP 13757042 dated Nov. 26, 2015, all pages.

(Continued)

*Primary Examiner* — Alexander Q Huerta
(74) *Attorney, Agent, or Firm* — Kilpatrick Townsend & Stockton LLP

(57) ABSTRACT

Various arrangements for providing bimodal digital video recording are presented. A plurality of over-the-air (OTA) television programs received via an antenna input port may be recorded to a local processor-readable storage medium. Record instructions may be transmitted to a cloud-based television programming service provider server system to remotely record and store scheduled streaming television programs to storage of the cloud-based television programming service provider server system. OTA television programs received via the antenna input port and recorded to the local processor-readable storage medium may be determined. Indications of television programs stored by the cloud-based television programming service provider server system may be received. Data may be output to a display device to present the bimodal DVR interface having a unified interface that simultaneously comprises indications of the recorded OTA television programs and indications of the scheduled streaming television programming.

15 Claims, 7 Drawing Sheets

(51) Int. Cl.
| | |
|---|---|
| *H04N 21/4147* | (2011.01) |
| *H04N 5/445* | (2011.01) |
| *H04N 21/482* | (2011.01) |
| *H04N 21/422* | (2011.01) |
| *H04N 21/2747* | (2011.01) |
| *G11B 27/10* | (2006.01) |
| *H04N 5/76* | (2006.01) |
| *H04N 21/472* | (2011.01) |

(52) U.S. Cl.
CPC ........... *H04N 5/76* (2013.01); *H04N 21/2747* (2013.01); *H04N 21/4147* (2013.01); *H04N 21/42209* (2013.01); *H04N 21/4622* (2013.01); *H04N 21/47214* (2013.01); *H04N 21/482* (2013.01); *H04N 21/4821* (2013.01)

(56) References Cited

U.S. PATENT DOCUMENTS

| | | | |
|---|---|---|---|
| 8,290,038 | B1 | 10/2012 | Wang et al. |
| 8,402,156 | B2 | 3/2013 | Brueck et al. |
| 8,370,514 | B2 | 5/2013 | Hurst et al. |
| 8,612,624 | B2 | 12/2013 | Brueck et al. |
| 8,683,066 | B2 | 3/2014 | Hurst et al. |
| 8,868,772 | B2 | 10/2014 | Major et al. |
| 8,880,721 | B2 | 11/2014 | Hurst et al. |
| 9,071,668 | B2 | 6/2015 | Brueck et al. |
| 9,178,923 | B2 | 11/2015 | Paul et al. |
| 9,716,856 | B2 | 7/2017 | Lynch et al. |
| 2002/0136231 | A1 | 9/2002 | Leatherbury et al. |
| 2003/0126607 | A1* | 7/2003 | Phillips .............. H04N 5/44543 725/55 |
| 2004/0078807 | A1* | 4/2004 | Fries ....................... H04N 7/165 725/14 |
| 2005/0022241 | A1* | 1/2005 | Griggs ................ H04N 5/4401 725/48 |
| 2005/0160461 | A1 | 7/2005 | Baumgartner et al. |
| 2006/0026302 | A1 | 2/2006 | Bennett et al. |
| 2007/0104456 | A1* | 5/2007 | Craner ................ H04N 9/7921 386/291 |
| 2008/0162713 | A1 | 7/2008 | Bowra et al. |
| 2008/0270933 | A1* | 10/2008 | Straw ..................... G06F 3/0481 715/781 |
| 2008/0301746 | A1 | 12/2008 | Wiser et al. |
| 2008/0301750 | A1 | 12/2008 | Silfvast et al. |
| 2009/0138907 | A1 | 5/2009 | Wiser et al. |
| 2009/0142036 | A1* | 6/2009 | Branam ............. H04N 5/44513 386/248 |
| 2009/0144776 | A1* | 6/2009 | Walter ................ H04N 5/44543 725/47 |
| 2010/0031162 | A1 | 2/2010 | Wiser et al. |
| 2010/0142597 | A1* | 6/2010 | Zhang .................. H01Q 1/2275 375/219 |
| 2010/0218223 | A1* | 8/2010 | Simpson ................ H04N 5/782 725/58 |
| 2010/0325666 | A1 | 12/2010 | Wiser et al. |
| 2011/0016490 | A1 | 1/2011 | Schaefer et al. |
| 2011/0016503 | A1 | 1/2011 | Schaefer et al. |
| 2011/0038613 | A1* | 2/2011 | Buchheit .................. H04N 5/76 386/297 |
| 2011/0143667 | A1 | 6/2011 | Cugnini et al. |
| 2011/0307929 | A1 | 12/2011 | Youssefmir et al. |
| 2011/0307942 | A1 | 12/2011 | Youssefmir et al. |
| 2012/0002000 | A1 | 1/2012 | Guerrero |
| 2012/0002717 | A1 | 1/2012 | Ma et al. |
| 2012/0005705 | A1 | 1/2012 | Youssefmir et al. |
| 2012/0044426 | A1 | 2/2012 | Jeffery et al. |
| 2012/0047535 | A1 | 2/2012 | Bennett et al. |
| 2012/0141089 | A1 | 6/2012 | Hunt |
| 2012/0314761 | A1 | 12/2012 | Melnyk et al. |
| 2013/0236158 | A1 | 9/2013 | Lynch et al. |
| 2014/0233923 | A1 | 8/2014 | Bradley et al. |
| 2014/0270713 | A1* | 9/2014 | Hybertson .......... H04N 21/4147 386/295 |
| 2015/0042882 | A1* | 2/2015 | Park .................. H04N 21/44008 348/570 |
| 2016/0156987 | A1* | 6/2016 | Paul ........................ H04N 5/76 725/49 |
| 2016/0205420 | A1* | 7/2016 | Ellis ................... H04N 5/44543 725/53 |
| 2016/0255397 | A1 | 9/2016 | Langan et al. |
| 2017/0034571 | A1* | 2/2017 | Natarajan .......... H04N 21/4335 |
| 2017/0142475 | A1* | 5/2017 | Williams ............. H04N 21/436 |
| 2017/0289496 | A1 | 10/2017 | Lynch et al. |
| 2018/0131990 | A1* | 5/2018 | Desclos .................. H04L 12/66 |

FOREIGN PATENT DOCUMENTS

| | | |
|---|---|---|
| WO | 2013/134006 A2 | 9/2013 |
| WO | 2017/000751 A1 | 1/2017 |

OTHER PUBLICATIONS

Office Action for EP 13757042 dated Jun. 6, 2017, all pages.
International Search Report and Written Opinion for PCT/US2013/027612 dated May 10, 2013, all pages.
International Preliminary Report on Patentability for PCT/US2013/027612 dated Oct. 14, 2014, all pages.
International Search Report and Written Opinion for PCT/US2018/065489 dated Mar. 19, 2019, all pages.
U.S. Appl. No. 15/624,377, filed Jun. 15, 2017 Notice of Allowance dated Apr. 2, 2019, all pages.

* cited by examiner

OVER THE TOP MEDIA INTEGRATION WITH OVER THE AIR BROADCAST MEDIA

BACKGROUND

Over-the-top (OTT) television programming services are becoming more popular. While such services may allow a user to purchase and view television channels and on-demand content via the Internet rather than through a television service provider's dedicated network, such an arrangement may be in some respects limited. For instance, television programs that are locally broadcast over the air may not be readily available via the OTT service.

SUMMARY

Various embodiments are described related to a method for providing bimodal digital video recording. In some embodiments, a method for providing bimodal digital video recording is described. The method may include recording, by a bimodal digital video recorder device, a plurality of over-the-air (OTA) television programs received via an antenna input port of the bimodal digital video recorder device to a local processor-readable storage medium. The method may include transmitting, by the bimodal digital video recorder device, a plurality of record instructions to a cloud-based television programming service provider server system to remotely record and store a plurality of scheduled streaming television programs to storage of the cloud-based television programming service provider server system. The method may include receiving, by the bimodal digital video recorder device, user input requesting a bimodal digital video recorder (DVR) interface. The method may include determining, by the bimodal digital video recorder device, the plurality of OTA television programs received via the antenna input port and recorded to the local processor-readable storage medium. The method may include receiving, by the bimodal digital video recorder device, indications of the plurality of scheduled streaming television programs stored by the cloud-based television programming service provider server system. The method may include outputting, by the bimodal digital video recorder device, data to a display device to present the bimodal DVR interface having a unified interface that simultaneously comprises indications of the plurality of recorded OTA television programs stored by the bimodal digital video recorder device and indications of the plurality of scheduled streaming television programming stored by the cloud-based television programming service provider system.

Embodiments of such a method may include one or more of the following features: The method may include organizing, by the bimodal digital video recorder device, the plurality of recorded OTA television programs and the plurality of scheduled streaming television programs according to a characteristic other than storage location or recording source. At least some of the plurality of recorded OTA television programs may be intermingled with at least some of the plurality of scheduled streaming television programs. The method may include executing, by an end user display device, an application that communicates, via a wireless interface, with the bimodal digital video recorder device. The method may include receiving, by the end user display device and the executed application, the data that indicates the plurality of recorded OTA television programs stored by the bimodal digital video recorder device and the plurality of scheduled streaming television programming stored by the cloud-based television programming service provider system. The method may include presenting, by the executed application on a display of the end user display device, based on the received data, a second unified interface that simultaneously presents indications of the plurality of recorded OTA television programs stored by the bimodal digital video recorder device and indications of the plurality of scheduled streaming television programming stored by the cloud-based television programming service provider system. The method may include receiving, by the application executed by the end user display device, a request to view a television program selected from the unified interface. The method may include determining, by the bimodal digital video recorder device, that the television program indicated by the request is part of the plurality of OTA television programs stored to the local processor-readable storage medium. The method may include streaming, by the bimodal digital video recorder device, the television program to the end user display device. The method may include receiving, by the bimodal digital video recorder device, an indication of a first amount of available storage space at the cloud-based television programming service provider server system linked with a user account that is also linked with the bimodal digital video recorder device. The method may include determining, by the bimodal digital video recorder device, a second amount of storage space available locally on a local processor-readable storage medium for storage of OTA television programs. The method may include outputting, by the bimodal digital video recorder device, data for simultaneous presentation to the display device indicative of the first amount and the second amount. The antenna input port may wirelessly receive television programming from a wireless antenna transmitted device connected with an antenna. The antenna input port may be a coaxial port that may be connected with an over-the-air antenna via a coaxial cable. The antenna input port may be a universal serial bus (USB) port that may connect with a USB device having an integrated antenna.

In some embodiments, a bimodal digital video recorder (DVR) system is described. The system may include a cloud-based television programming service provider system that remotely records television programming for users linked with a plurality of user accounts. The system may include a bimodal digital video recorder device. The device may include an antenna input port that connects with an over-the-air antenna that receives television programming in VHF and/or UHF frequency bands. The device may include a network interface that communicates with a cloud-based television programming service provider server system. The device may include one or more processor-readable storage mediums having at least a portion of storage allocated for recording television programming. The device may include one or more processors communicatively coupled with the one or more processor-readable storage mediums and the network interface. The one or more processors may be configured to execute instructions stored by the one or more processor-readable storage mediums that cause the one or more processors to record over-the-air (OTA) television programming received via the antenna input port to the one or more processor-readable storage mediums. The one or more processors may cause an instruction to be transmitted to the cloud-based television programming service provider server system to remotely record and store scheduled streaming television programming to a storage device of the cloud-based television programming service provider server system. The one or more processors may output data to a display device to present a unified DVR interface that simultaneously comprises indications of recorded OTA television programming received by the bimodal DVR device via the antenna input port to the one or more processor-readable storage mediums and indications of the scheduled streaming television programming stored by the cloud-based television programming service provider system.

Embodiments of such a system may include one or more of the following features: The system may include the over-the-air antenna. The instructions, when executed, may further cause the one or more processors to output data to the display device that indicates, for each television program of a plurality of recorded television programs, whether the television program is recorded OTA programming received by the bimodal DVR device via the antenna input port or scheduled streaming television programming stored by the cloud-based television programming server system. The instructions, when executed, may further cause the one or more processors to calculate a first amount of space available at the one or more processor-readable storage mediums of the bimodal DVR device for recording television programming. The one or more processors may receive an indication of a second amount of space available at the cloud-based television programming service provider system allocated to a user account that is registered with the bimodal DVR device. The one or more processors may output data to the display device for presentation as part of a unified interface that simultaneously indicates an amount of space available for storage of television programming at the bimodal DVR device and at the cloud-based television programming service provider system as allocated to the user account. The instructions, when executed, may further cause the one or more processors to perform an initial test reception procedure in which each television channel of a plurality of television channels may be tested to determine if the television channel can be received over-the-air via the antenna input port with at least a threshold signal strength. The one or more processors may transmit data indicative of which television channels of the plurality of television channels can be received over-the-air via the antenna input port with at least the threshold signal strength. The one or more processors may output data to the display device that may cause an electronic programming guide (EPG) to be presented that indicates the television channels of the plurality of television channels that can be received over-the-air via the antenna input port and television channels that provide the scheduled streaming television programming via the cloud-based television programming service provider server system.

In some embodiments, a bimodal digital video recorder (DVR) device is described. The device may include an antenna input port that connects with an indoor or outdoor antenna that receives television programming in the VHF and/or UHF frequency bands. The device may include a network interface that communicates with a cloud-based television programming service provider server system and end-user viewing devices. The device may include one or more processor-readable storage mediums having at least a portion of storage allocated for recording television programming. The device may include one or more processors communicatively coupled with the one or more processor-readable storage mediums and the network interface. The one or more processors may be configured to execute instructions stored by the one or more processor-readable storage mediums that cause the one or more processors to record over-the-air (OTA) television programming received via the antenna input port to the one or more processor-readable storage mediums. The one or more processors may transmit an instruction to the cloud-based television programming service provider server system to remotely record and store scheduled streaming television programming to a storage device of the cloud-based television programming service provider server system. The one or more processors may output data to a display device to present a unified DVR interface that simultaneously comprises indications of recorded OTA television programming received by the bimodal DVR device via the antenna input port to the one or more processor-readable storage mediums and indications of the scheduled streaming television programming stored by the cloud-based television programming service provider system.

Embodiments of such a method may include one or more of the following features: The instructions, when executed, may further cause the one or more processors to output data to the display device that indicates, for each television program of a plurality of recorded television programs, whether the television program is recorded OTA programming received by the bimodal DVR device via the antenna input port or scheduled streaming television programming stored by the cloud-based television programming server system. The instructions, when executed, may further cause the one or more processors to calculate a first amount of space available at the one or more processor-readable storage mediums of the bimodal DVR device for recording television programming. The one or more processors may receive an indication of a second amount of space available at the cloud-based television programming service provider system allocated to a user account that is registered with the bimodal DVR device. The one or more processors may output data to the display device for presentation as part of a unified interface that simultaneously indicates an amount of space available for storage of television programming at the bimodal DVR device and at the cloud-based television programming service provider system as allocated to the user account. The instructions, when executed, may further cause the one or more processors to perform an initial test reception procedure in which each television channel of a plurality of television channels is tested to determine if the television channel can be received over-the-air via the antenna input port with at least a threshold signal strength. The one or more processors may transmit data indicative of which television channels of the plurality of television channels can be received over-the-air via the antenna input port with at least the threshold signal strength. The one or more processors may output data to the display device that causes an electronic programming guide (EPG) to be presented that indicates the television channels of the plurality of television channels that can be received over-the-air via the antenna input port and television channels that provide the scheduled streaming television programming via the cloud-based television programming service provider server system. The antenna input port may wirelessly receive television programming from a wireless antenna transmitted device connected with the indoor or outdoor antenna. The antenna input port may be a coaxial port that may be connected with the indoor or outdoor antenna via a coaxial cable. The antenna input port may be a universal serial bus (USB) port that may connect with a USB device in which the antenna is integrated.

DETAILED DESCRIPTION

While an OTT service may provide a user with a wide selection of television channels and on-demand content that can be streamed to a display device, streaming versions of such local channels may not be available via the OTT service or the user may need to pay extra for access to streaming versions of such local channels via the OTT service. However, such local channels may be broadcast over the air (OTA), possibly as over-the-air digital television channels (OTA DTv) using VHF and/or UHF frequencies. To receive such channels directly, a user may need to have installed an antenna, which is typically located in a structure's attic, on a roof, or attached to an eve or window.

Embodiments detailed herein provide systems and interfaces for allowing a user to take advantage of both OTT services and OTA television programming broadcasts, both for recording and live viewing. Using a bimodal digital video recorder, OTT television channel streaming services can be accessed from a remote cloud-based television service provider server system and locally broadcast OTA television channels can be received via an antenna port. When television programming is desired to be recorded, the location to which the television program is recorded may vary based on the source of the programming. If the source of the television programming is the cloud-based server system, the cloud-based server system may record and store the television programming remote from the bimodal digital video record. If the source of the television programming is an OTA television programming broadcast, the bimodal digital video record may receive the OTA television programming via an antenna port and may record and store the OTA television programming locally. For live viewing, the live broadcast or transmission may be output for viewing on an end user device.

Further, a unified interface may be presented such that recorded OTA television programming and cloud-stored television programming are presented for selection for playback, live viewing, and/or management. The interface may not sort the television programming based on the storage location or the source of the recording or live programming, but may instead sort the television programming based on characteristics related to the status of the content, such as the order of recording, alphabetically, which programming has not yet been viewed, and according to broadcast schedule. Therefore, in such a unified interface, recorded and live OTA television programming and cloud-recorded television programming is intermingled regardless of the recording and storage location. Notably, the recorded OTA programming and the cloud-stored television programming are presented as part of the same interface and are not sorted from each other based on recording location or storage location.

Figure 1:
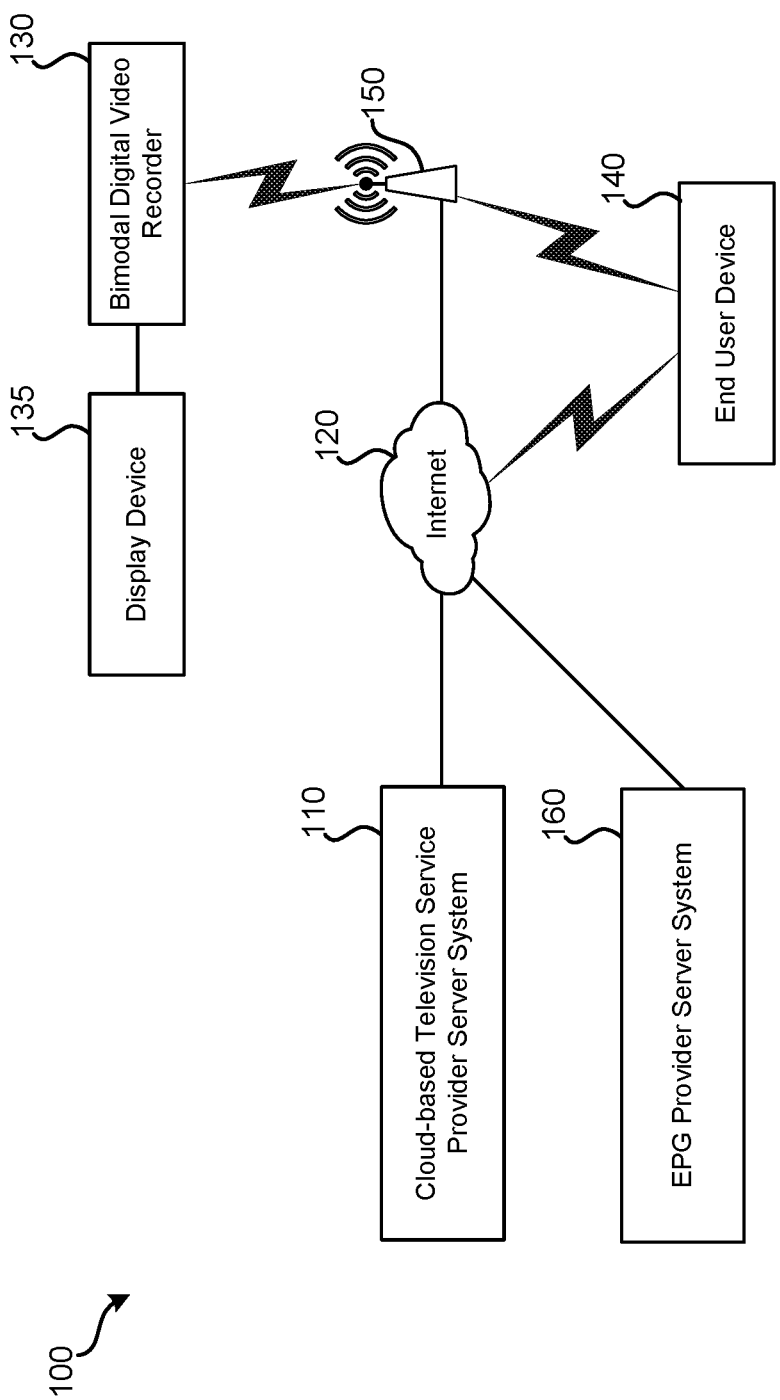
FIG. 1 illustrates an embodiment of a bimodal digital video recording system.

Details and additional or alternative features of such embodiments are described in relation to the figures. FIG. 1 illustrates an embodiment of a bimodal digital video recording system 100. Bimodal digital video recording system 100 ("system 100") may include: cloud-based television service provider server system 110 ("cloud-based server system 110"), Internet 120, bimodal digital video recorder 130 ("bimodal DVR 130"), display device 135, end-user device 140, wireless access point 150 ("WAP 150"), and electronic programming guide (EPG) provider server system 160.

Cloud-based television service provider server system 110 may receive streams of television channels (which include television programs) from various content providers. Examples of content providers may be ESPN®, FX®, Comedy Central®, CNN®, BBC®, Lifetime®, Food Network®, TNT®, MSNBC®, etc. Through cloud-based server system 110, a user may obtain individualized access to a subset of such content providers. Such content may be streamed to bimodal DVR 130 and/or end-user device 140 via cloud-based server system 110. Further detail regarding cloud-based server system 110 is provided in relation to FIG. 3. Streams of television channels received by cloud-based server system 110 may be referred to as "scheduled" television channel streams to indicate that the cloud-based server receives programming for the television channels according to a schedule and is therefore required to record the television channel over a particular time period (e.g., in response to a user-defined instruction) if a particular television program streamed is desired to be recorded and stored. For scheduled streaming television programming to be recorded, a user may need to define a record timer that defines a time period and television channel to be recorded from a television channel stream received by the cloud-based server. This distinguishes scheduled streaming content from on-demand content, which is available for streaming at any time and does not need to be recorded based on a user-defined instruction.

Internet 120 may be used for communication between cloud-based server system 110, bimodal DVR 130, and end-user device 140. By virtue of television programming being transmitted to end-user device 140 and/or bimodal DVR 130 via Internet 120, the service provided by cloud-based server system 110 may be referred to as an over the top (OTT) television service since Internet 120 is used for distribution rather than a dedicated television service provider network (such as a cable network or satellite network).

Bimodal DVR 130 may function to access scheduled streaming television programming from cloud-based server system 110 and record over the air (OTA) television programming via one or more antennas. Bimodal DVR 130 may communicate with Internet 120 via WAP 150. WAP 150 may communicate wirelessly using an IEEE 802.11 protocol or some other protocol having high enough bandwidth to transmit live high definition content. In some embodiments, bimodal DVR 130 may communicate via a wire and wired communication protocol with access point 150 or with some other form of device that can be used to connect with the Internet, such as a modem or router. As such, in some embodiments, wireless access point 150 may not be capable of wireless communication. Bimodal DVR 130 may output video and audio signals to a display device 135. Display device 135 may be a monitor, television, or some other display capable of presenting video. Further detail regarding bimodal DVR 130 is provided in relation to FIG. 2.

End-user device 140 can represent various forms of computerized devices through which communication with cloud-based server system 110 and bimodal DVR 130 can be realized. End-user device 140 may be a smartphone, tablet computer, laptop computer, desktop computer, smart TV, or some other form of computerized device. End-user device 140 may be used by a user to interact with bimodal DVR 130. A user may stream content stored by bimodal DVR 130 to end-user device 140 for viewing or may stream content received by bimodal DVR 130 live. Such streaming may be accomplished directly via WAP 150 or may be performed via Internet 120 (such as if end-user device 140 is not connected to WAP 150 and is located at a remote location). End-user device 140 may also be used to view television programming available from cloud-based server system 110. The user may be required to provide an indication of a user account and login information to permit end-user device 140 to stream content from cloud-based server system 110 and/or bimodal DVR 130. Further detail regarding end-user device 140 is provided in relation to FIG. 4.

Figure 2:
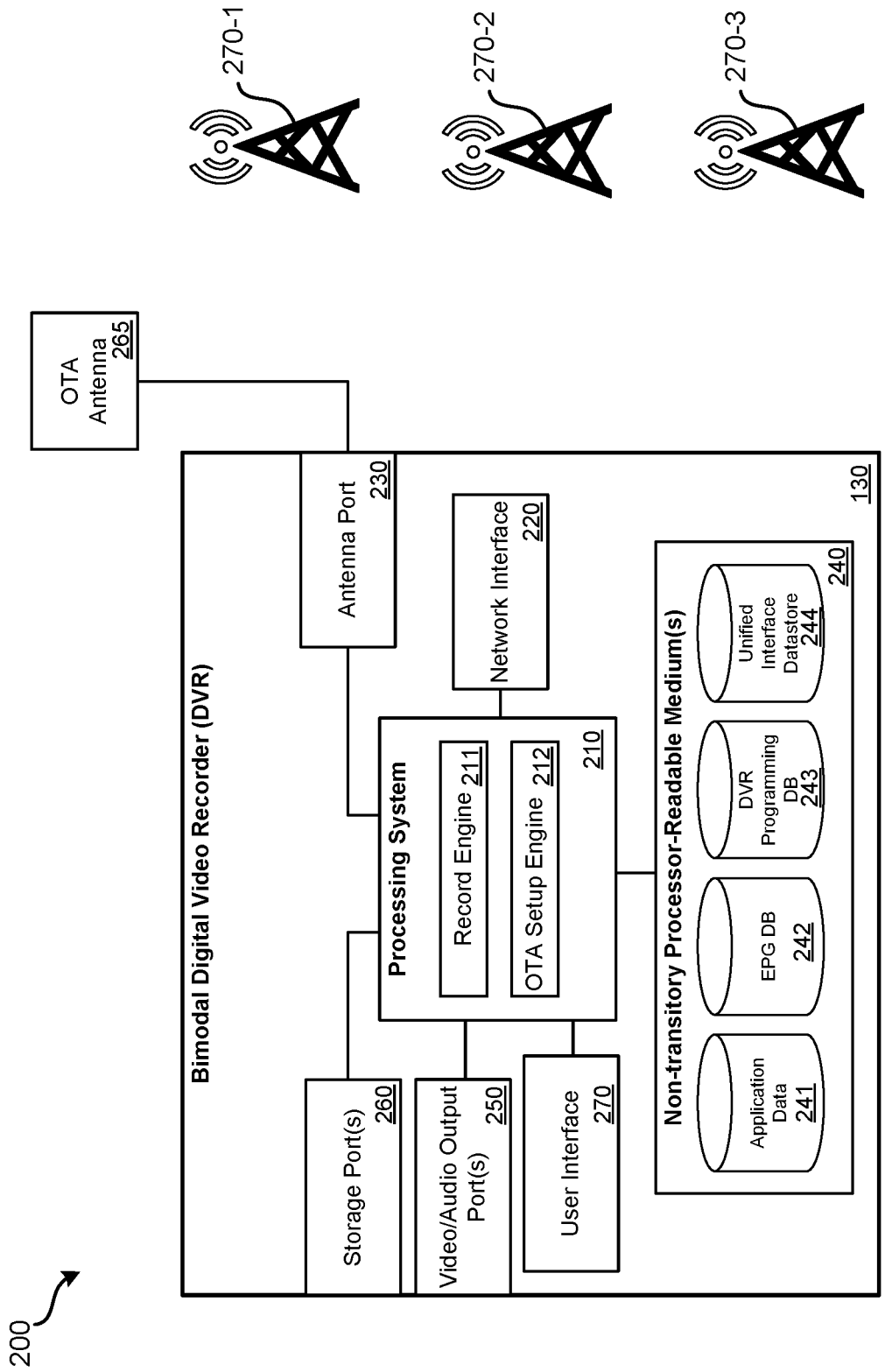
FIG. 2 illustrates an embodiment of a bimodal digital video recorder (DVR).

FIG. 2 illustrates an embodiment 200 of a bimodal digital video recorder (DVR) connected with an OTA antenna 265. Bimodal DVR 130 may include: processing system 210, network interface 220, antenna port 230, one or more non-transitory processor readable mediums 240, one or more video/audio output ports 250, one or more storage ports 260, and user interface 270. Bimodal DVR 130 may be battery powered and/or receive power from a wired source, such as a 110 V power outlet.

Antenna port 230 may connect with coaxial cable that is intended to be connected with OTA antenna 265. Antenna port 230 may, in other embodiments, connect with a wire or cable other than a coaxial cable. Alternatively, wireless communication can be used between OTA antenna 265 and antenna port 230. In such embodiments, antenna port 230 may include a wireless communication interface to receive live television programming from an RF transmission system connected with antenna 265. Antenna port 230 may be used to receive OTA signals in the VHF, UHF, and/or other RF frequency bands. Antenna port 230 may be used to receive analog and/or digital television channels, such as high-definition (HD) television channels that are locally broadcast over the air. In some embodiments, multiple antenna ports may be present on bimodal DVR 130 to connect with multiple OTA antennas. Antenna port 230 may be connected with processing system 210. In some embodiments antenna pot 230 may be a universal serial bus (USB) port that connects with an antenna that is integrated as part of a USB device.

Processing system 210 may include one or more processors that are configured to perform various functions. Such one or more processors may be general-purpose processors that execute stored processor readable instructions or may be special-purpose processors that are designed or configured to perform particular functions. Processing system 210 may receive an antenna feed from antenna port 230. Processing system 210 may perform bidirectional communication with network interface 220. Processing system 210 may read and write data to one or more non-transitory processor-readable mediums 240. Processing system 210 may receive user input from user interface 270. Processing system 210 may output video and audio data to one or more video/audio output ports 250. Processing system 210 may be able to read data from and write data to one or more storage ports 260.

Network interface 220 may permit processing system 210 to communicate with one or more end-user devices, a cloud-based server, and, generally, various services available via the Internet. Network interface 220 may communicate using an IEEE 802.11 protocol or some other wireless protocol that has sufficient bandwidth to transmit video and audio data. In some embodiments, additionally or alternatively, a wired network interface may be present. Such a wired network interface may be connected, via a wire, to an Internet access point. For such wired communication, a protocol such as Ethernet may be used.

Non-transitory processor readable mediums 240 may include one or more of the following: a hard drive, random-access memory, read-only memory, flash memory, or some other form of non-transitory data storage to perform tasks such as video storage. Additional storage may be added via one or more storage ports 260. Storage ports 260 may be USB ports that allow hard drives, flash memories, and/or some other form of non-transitory data storage to be removably connected with bimodal DVR 130. One or more storage ports 260 may be used for storage of recorded over the air television programming. Therefore, to increase an amount of storage space available for recording of OTA programming, a storage device having free storage space may be connected to one or more storage ports 260.

Video/audio output ports 250 may represent one or more ports that output video and audio to a presentation device and/or audio system. One or more video/audio output ports 250 may include: one or more HDMI ports; component video outputs; RCA audio output ports; one or more USB outputs; one or more optical audio outputs, etc. Video/audio output ports 250 may be connected to a display device, such as a television. Therefore, the television may be used to present recorded content as well as one or more visual user interfaces that allow a user to interact with bimodal DVR 130. In some embodiments, video/audio output ports 250 may not present. That is, bimodal DVR 130 may only transmit live or recording programming wirelessly or via a network to other devices.

User interface 270 may represent a physical input device that allows a user to provide input directly to bimodal DVR 100. User interface 270 may be a remote control, smartphone, or other computerized device that wirelessly communicates with bimodal DVR 100. Therefore, user interface 270 may include an RF or IR receiver that receives wireless signals from a remote control. Such a remote control may be used for controlling functionality of bimodal DVR 130. In some embodiments, user interface 270 may not be present. Rather, user input may only be provided to a separate end user device which receives live and recorded programming from bimodal DVR 100.

Processing system 210 may perform various functions, including the functions of record engine 211 and OTA setup engine 212. Record engine 211 may allow processing system 210 to record OTA television programming received via antenna port 230 to either DVR programming database 243 or to an external storage device via one or more storage ports 260. Record engine 211 may use data from EPG database 242 to determine the start time, end time, and channel of a particular television program selected by user for recording. If the television program selected by the user for recording is not available over the air, but rather is available via streaming from the cloud-based server, record engine 211 may send an instruction to record the television programming to the cloud-based server system via network interface 220.

OTA setup engine 212 may perform an initial configuration of bimodal DVR 130 to determine television channels that can be received via antenna port 230 with a sufficiently high signal strength to be recorded by bimodal DVR 130. Upon receiving a set of commands, OTA setup engine 212 may scan through each possible television channel frequency to determine if a television channel is present at the given frequency and is being received with a signal strength above a defined signal strength threshold. Data indicative of which television channels can be received at a sufficient signal strength for recording may be transmitted to an end-user device for presentation, to a television for presentation via one or more video audio output ports 250, and/or to the cloud-based server.

One or more non-transitory processor readable mediums 240 may store various databases or other various data storage arrangements to store data related to bimodal DVR 130. Application data 241 may store data related to particular applications that may be executed by bimodal DVR 130. For example, video and audio content may be streamed to video/audio output ports 250 from a cloud-based server system related to a third-party, such as Netflix® or HBO®. EPG database 202 may store programming information about when television programming is scheduled to be broadcast (OTA and streaming) on various television channels accessible via bimodal DVR 130. The television channels included in EPG database 242 may include television channels that can be successfully received via antenna port 230 and television channels that the user has access to via the cloud-based server. Data for EPG database 242 may be obtained from a dedicated EPG server, such as EPG provider server system 160 of FIG. 1. Such an EPG provider server system 160 may be operated by a third-party that serves EPG data. In other embodiments, EPG data may be routed through cloud-based television service provider server system 110.

DVR programming database 243 may be used to store television programs that are received via antenna port 230. Streaming television programming may not be stored by DVR programming database 243. DVR programming database 243 may be expanded to include storage on one or more external storage devices available via one or more storage ports 260. Therefore, the total amount of storage space devoted to DVR programming database 243 may be dependent on the size of the external storage devices connected with storage ports 260. A portion of one or more non-transitory processor readable mediums 240 may be allocated to DVR programming database 243 such that even if no external devices are connected with storage ports 260, at least some storage is available for the recording of OTA programming.

Unified interface data store 244 may represent storage of one or more interfaces that are output for presentation via video/audio output ports 250 and allow a user to interact with OTA programming and cloud stored programming. Unified interface data store 244 may be intended to store one or more unified interfaces that allow a user to interact with recorded television programming with little or no regard to the location of the stored programming. Therefore, from a user's point of view, recorded television programming that was recorded locally from over the air or was recorded locally to the cloud-based server may have little or no impact on how such programming is presented within the unified interface for playback. Therefore, interfaces within unified interface data store 244 may intermingle recorded OTA programming with recorded OTT streaming programming. Further detail regarding such a unified interface that may be included as part of unified interface data store 244 is presented in FIG. 5.

Figure 3:
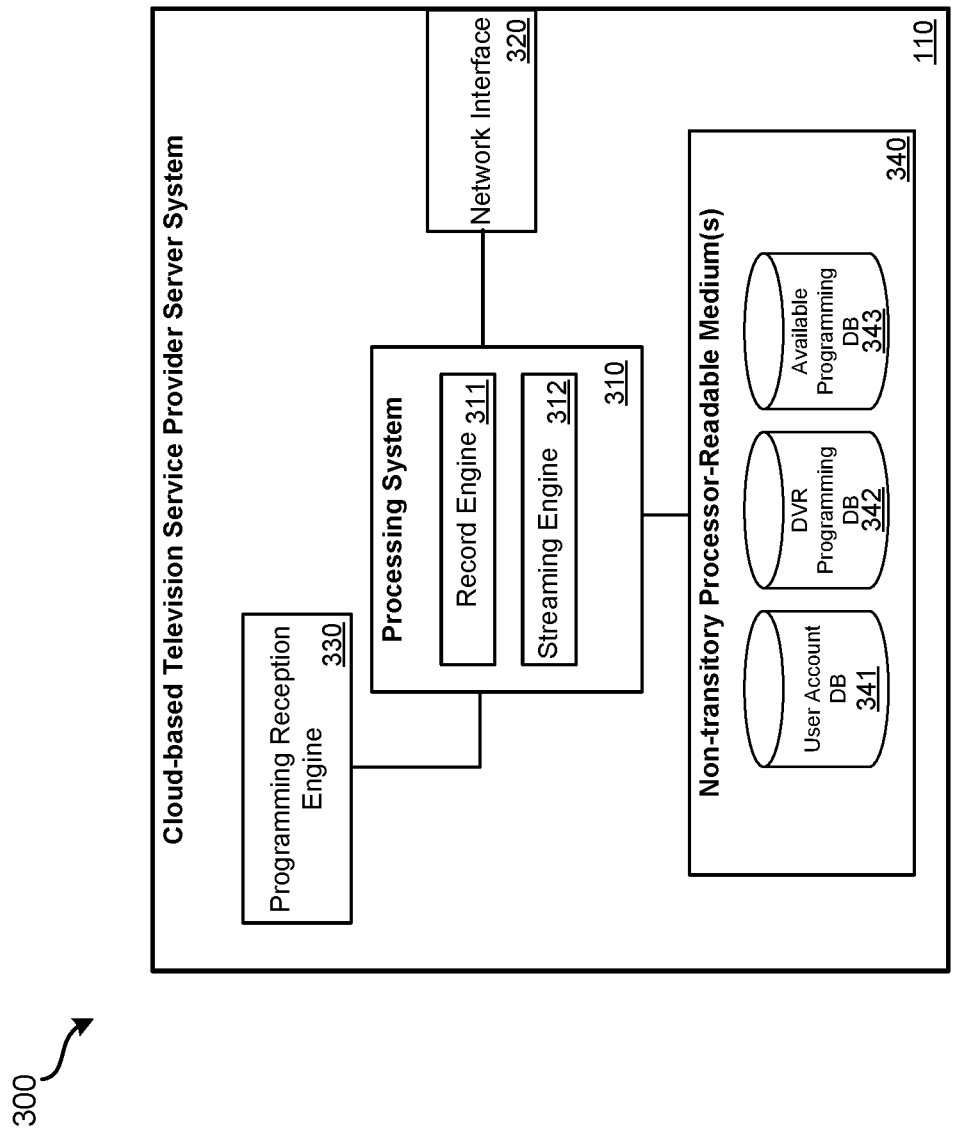
FIG. 3 illustrates an embodiment of a cloud-based television service provider server system.

FIG. 3 illustrates an embodiment 300 of a cloud-based television service provider server system 110. Cloud-based server system 110 may include: processing system 310, network interface 320, programming reception engine 330, and one or more non-transitory processor readable mediums 340.

Processing system 310 may include one or more processors that are configured to perform various functions. Such one or more processors may be general-purpose processors that execute stored processor readable instructions or may be special-purpose processors that are configured to perform particular functions. Processing system 310 may perform bidirectional communication with network interface 320. Processing system 310 may coordinate the recording of programming from programming reception engine 330 to DVR programming database 342. Processing system 310 may read and write data to non-transitory processor readable mediums 340.

Network interface 320 may permit processing system 310 to communicate with one or more end-user devices, one or move bimodal DVR devices (such as bimodal DVR 130), and, generally, various computing devices accessible via the Internet. Network interface 320 may use a wired communication. A protocol such as Ethernet may be used.

Programming reception engine 330 may serve to receive streams of television programs from various content providers. Cloud-based server system 110 may manage recordings and live streaming of such streaming television channels for multiple user accounts that are linked with multiple bimodal DVRs.

Processing system 310 may perform various functions, including record engine 311 and streaming engine 312. Record engine 311 may serve to record a television channel stream to DVR programming database 342 in association with a particular user account. If multiple requests to record a particular television program on a television channel have been received from multiple different user accounts, individual instances of the television program may be recorded to DVR programming database 342—one instance in association with each account's request. All television programming that is recorded by cloud-based server system 110 may be stored to DVR programming database 342. Streaming engine 312 may transmit live feeds of television channels from programming reception engine 332 and an end-user device or a bimodal DVR via network interface 320. Streaming engine 312 may also transmit streams of recorded television programs from DVR programming database 342 to an end-user device or bimodal DVR that is linked with the user account with which the recording is associated.

User account database 341 may store information on the various user accounts of cloud-based server system 110. User account database 341 may indicate the particular end-user device and bimodal DVR that are permitted to access a particular user account. Recordings of television programs made to DVR programming database 342 may each be linked to a particular user account indicated in user account database 341. As previously indicated, many copies of the same recording may be present within DVR programming database 342, but may each be linked with a different user account in user account database 341.

Available programming database 343 may store indications of the particular television channels that are available in association with a given user account and linked bimodal DVR. Available programming database 343, for a given user account, may indicate streaming television channels available via programming reception engine 330 that are permissible to access in accordance with the user account and may indicate the television channels that are received with a sufficient signal strength at the bimodal DVR associated with the user account to be eligible to be recorded.

Figure 4:
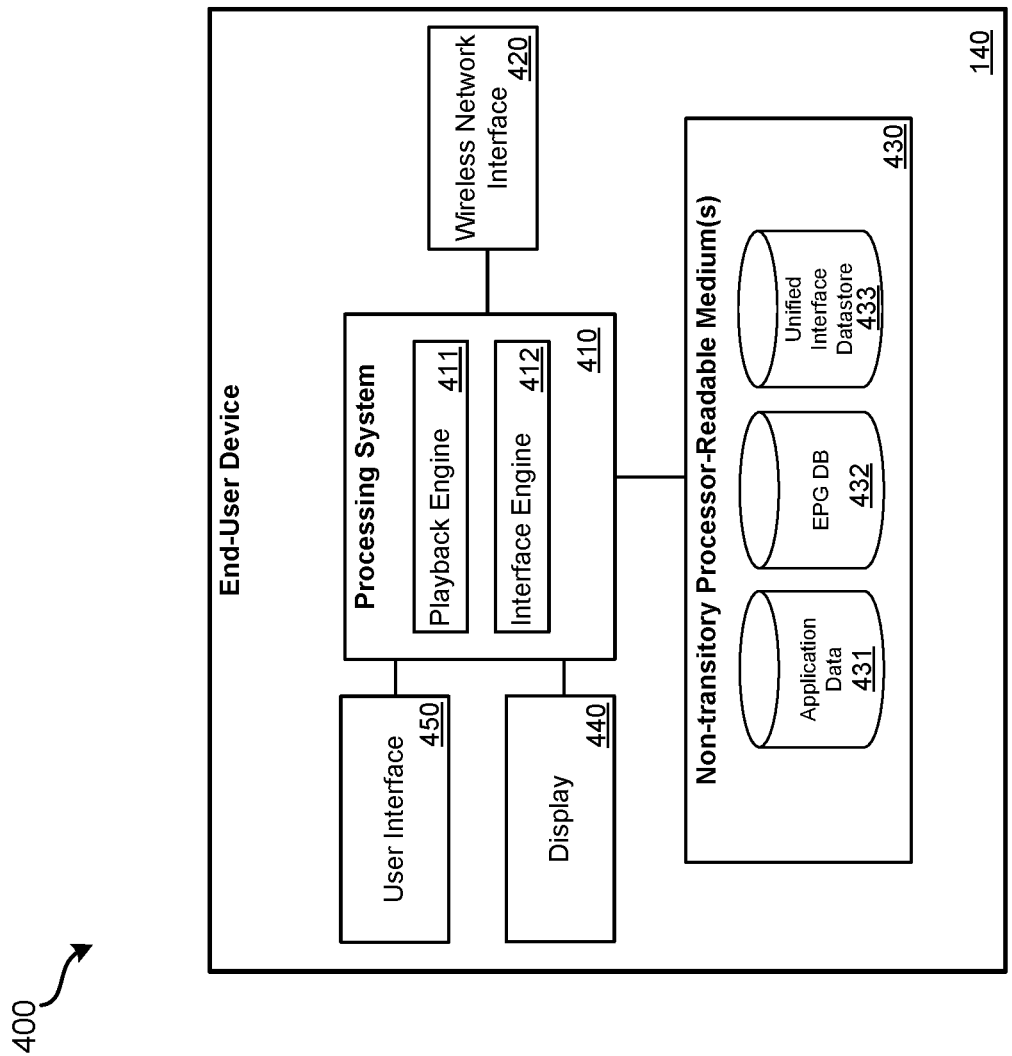
FIG. 4 illustrates an embodiment of an end-user device.

FIG. 4 illustrates an embodiment 400 of an end-user device 140. End-user device 140 may be used for presenting OTA television programming from a bimodal DVR linked with the same account as the end-user device 140, for streaming television programming from a cloud-based server, and/or for setting record timers at the cloud-based server system and/or bimodal DVR. End-user device 140 may include: processing system 410, wireless network interface 420, one or more non-transitory processor readable mediums 430, display 440, and user interface 450.

Processing system 410 may include one or more processors that are configured to perform various functions. Such one or more processors may be general-purpose processors that execute stored processor readable instructions or may be special-purpose processors that are configured to perform particular functions. Processing system 410 may perform bidirectional communication with wireless network interface 420. Processing system 410 may read and write data to one or more non-transitory processor readable mediums 430. Processing system 410 may output programming and interfaces for display to display 440; processing system 410 may receive input from user interface 450.

Wireless network interface 420 may permit processing system 410 to communicate with cloud-based server system 110, bimodal DVR 130 and, generally, various services available via the Internet. Wireless network interface 420 may communicate using an IEEE 802.11 protocol or some other wireless protocol that has sufficient bandwidth to transmit video and audio data. In some embodiments, additionally or alternatively, a wired network interface may be present. Such a wired network interface may be connected, via a wire, to an Internet access point. For such wired communication, a protocol such as Ethernet may be used. End-user device 140 may use a cellular network (e.g., LTE, 3G, 4G, etc.) to connect with the Internet.

One or more non-transitory processor readable mediums 430 may store various databases or other various data storage arrangements to store data related to end-user device 140. Application data 431 may store data related to particular applications that may be executed by end-user device 140. For example, a specialized application may be downloaded and installed on one or more non-transitory processor readable mediums 430 for use in accessing the cloud-based server system and the bimodal DVR linked with the same account as the end-user device. EPG database 432 may store programming information about when television programming is scheduled to be broadcast (OTA and streaming) on various television channels accessible as streaming through the cloud-based server system and via the bimodal DVR linked with the same user account. The television channels indicated in EPG database 242 may include television channels that can be successfully received via an antenna port of the bimodal DVR and streaming television channels that the user has access to via the cloud-based server. Data for EPG database 432 may be obtained from a dedicated EPG server, such as EPG provider server system 160 of FIG. 1. In other embodiments, EPG data may be routed through cloud-based television service provider server system 110.

Unified interface data store 433 may represent storage of one or more interfaces that are output for presentation via display 440 (and, possibly, a speaker) and allow a user to interact with OTA programming and cloud stored programming. Unified interface data store 433 may function as detailed in relation to unified interface data store 244.

User interface 450 may be a keyboard, pointing device, microphone, or some other form of input device that allows a user to provide input to end-user device 140. In some embodiments, user interface 450 may be a touchscreen that is incorporated as part of display 440. Therefore, display 440 and user interface 450 may represent components of a single touchscreen.

Processing system 410 may perform various functions, including playback engine 411 and interface engine 412. Playback engine 411 may allow processing system 410 to playback OTA television programming received from a bimodal DVR and playback streaming television program received from the cloud-based server. Television programming from the cloud-based server system may be either live or stored in the cloud-based DVR database and linked with the same user account as end-user device 140. Interface engine 412 may use one or more interfaces from unified interface data store 433 to present an interface, via display 440, to allow a user to interact with both cloud-based stored streaming television programming and OTA television programming stored by the bimodal DVR linked with the same user account as the end-user device 140. Therefore, the same or similar unified interfaces that are output for presentation by bimodal DVR may be output for presentation by end-user device 140.

Figure 5:
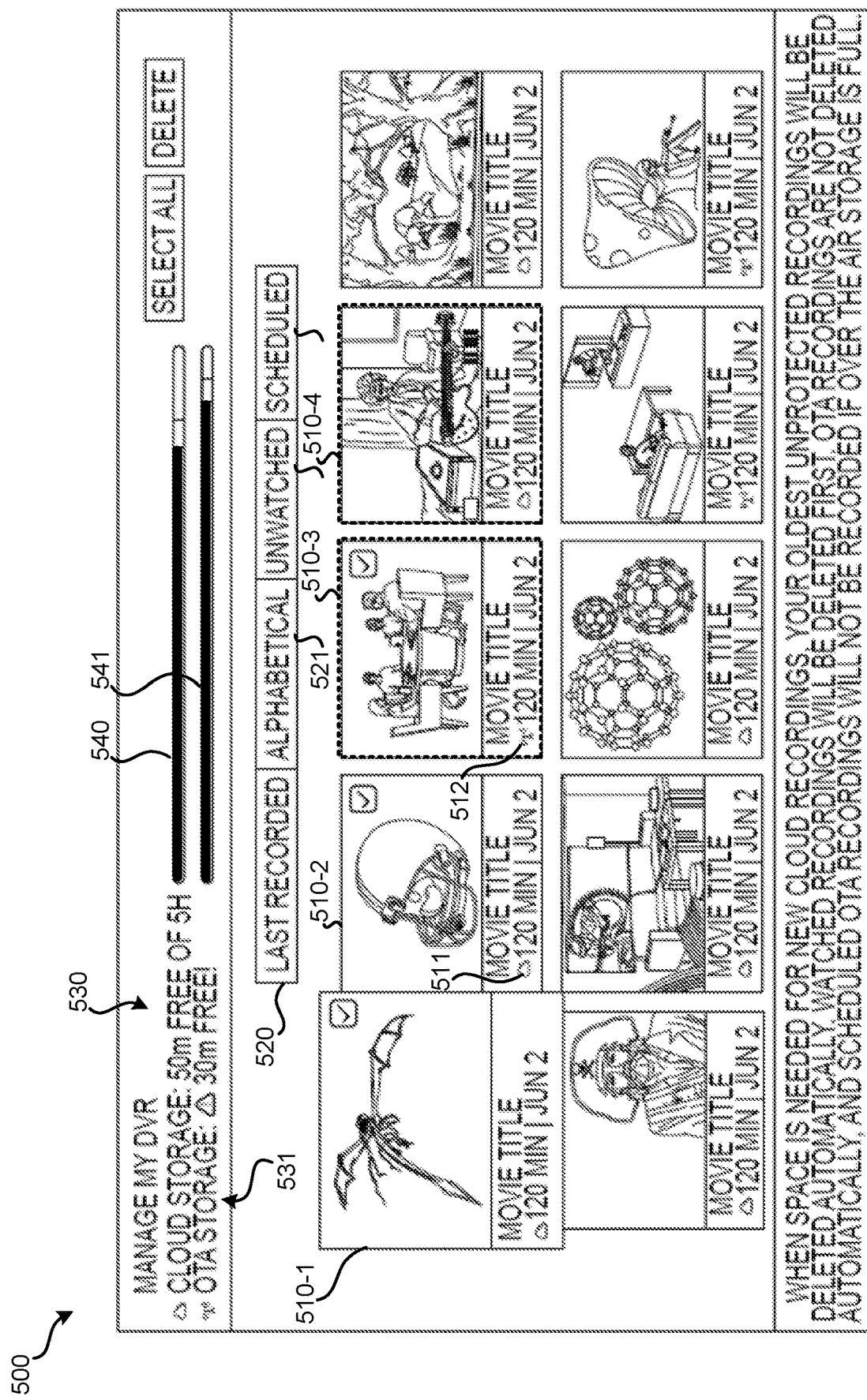
FIG. 5 illustrates an embodiment of a bimodal DVR interface.

FIG. 5 illustrates an embodiment of a unified DVR interface 500. Unified DVR interface 500 may be a unified interface that is output for presentation by a bimodal DVR, such as bimodal DVR 134, or by an end-user device, such as end-user device 140. Unified DVR interface 500 allows a user to interact with television programming that was recorded over the air by a bimodal DVR and scheduled streaming television programming that was recorded in the cloud by a cloud-based server, such as cloud-based server system 110. From a user's point of view, when interacting with unified DVR interface 500, whether the television content was recorded from an OTA source, was recorded from a streaming source, was recorded to the cloud-based server, or was recorded to local storage of the bimodal DVR makes no difference. Rather, a single unified interface presents recorded OTA content and recorded streaming content intermingled and arranged according to other properties of the recorded content rather than storage location or source.

Recording entry 510-2 of recording entries 510 represents an example entry of the ten entries illustrated in unified DVR interface 500. For simplicity, only four of recording entries 510 are labelled. Recording entry 510-2 indicates a movie title, a duration of the programming, a streaming or broadcast date, a storage location, and a show card. Graphic indicator 511 indicates that the storage location of the television programming linked with recording entry 510-2 is stored in the cloud by cloud-based server system 110. Further, graphic indicator 511 indicates that the television programming linked with recording entry 510-2 was recorded from a streaming source (as opposed to OTA).

For recording entry 510-3, graphical indicator 512 indicates that the television programming linked with recording entry 510-3 was recorded from an OTA source (as opposed to a streaming source). Further, graphic indicator 512 indicates that the storage location of the television program linked with recording entry 510-3 is stored locally by the bimodal DVR. From the user's point of view, recording entry 510-2 and recording entry 510-3 are presented as part of a unified interface that does not separate entries based on storage location or source of recording. For instance, of recording entries 510-2, 510-3, and 510-4, only the center entry, 510-3, was recorded over the air, while recording entries 510-2 and 510-4 were recorded in the cloud from a streaming source.

Rather than sorting according to recording source or according to storage location, other characteristics may be used to sort recording entries presented within the unified DVR interface 500. In unified DVR interface 500, characteristics such as last recorded program 520, alphabetical listing 521, unwatched programs 522, and scheduled programs 523 may be used rather than any separation based on recording source or storage location. Last recorded program 520 may rank recording entries 510 according to when the associated television program was recorded based on date and time regardless of whether the recording occurred in the cloud at the cloud-based server system from a streaming source or at the bimodal DVR from an OTA source. Alphabetical listing 521 may rank recording entries 510 alphabetically according to the title of each television program regardless of whether the recording occurred in the cloud at the cloud-based server from a streaming source or at the bimodal DVR from an OTA source. Unwatched programs 522 may rank recording entries 510 according to which television programs have yet to be output for presentation. Such a ranking may occur regardless of whether the recording occurred in the cloud at the cloud-based server from the streaming source or at the bimodal DVR from an OTA source. Scheduled programs 523 may be used to rank recording entries 510 that have yet to be recorded according to the upcoming scheduled broadcast date and time. For scheduled programs 523, a record timer may be set and stored to the appropriate location (bimodal DVR for OTA programming, cloud-based server system for scheduled streaming programming). Regardless of whether the television program is to be streamed or broadcast over the air, each television program is distributed by the content provider at a particular date and time. This date and time may be used to rank recording entries 510 regardless of whether the television program is streamed and recorded by the cloud-based server system or is broadcast over the air and is recorded by the bimodal DVR.

Graphical indicator 540 graphically indicates an amount of storage space available and used at the cloud-based server system in relation with the user account linked with the unified DVR interface 500. Graphical indicator 541 graphically indicates the amount of storage space available and used at the bimodal DVR recording of OTA television programming. Similarly, indication 530 indicates an amount of time available for recording at the cloud-based server system in relation to the user account linked to unified DVR interface 500. Indication 531 indicates an amount of time available for recording at the linked bimodal DVR for OTA programming. Such indications of recording space and time may be presented as part of the same unified interface as recording entries 510. Therefore, in a single interface, indications of television programming stored by server and the bimodal DVR along with available amounts of storage space at each location may be presented simultaneously.

Programming entry 510-1 represents the programming entry that is currently selected. Programming entry 510-1 may be highlighted and/or may be displayed larger than other recording entries 510 to indicate that it is currently selected. User input may be provided to select a different entry within the unified DVR interface. Once an entry has been selected, a user may have the option of initiating playback, regardless of the storage location of the program.

Unified DVR interface 500 represents an example embodiment in which television programming recorded to a cloud-based server system and to a bimodal DVR may be presented as part of a unified DVR interface. It should be understood that in other embodiments, various changes may be made to such an embodiment, such as the number and layout of recording entries 510 and/or how the amount of available and used storage space is presented for both the cloud-based server system and the bimodal DVR.

Figures 6A, 6B:
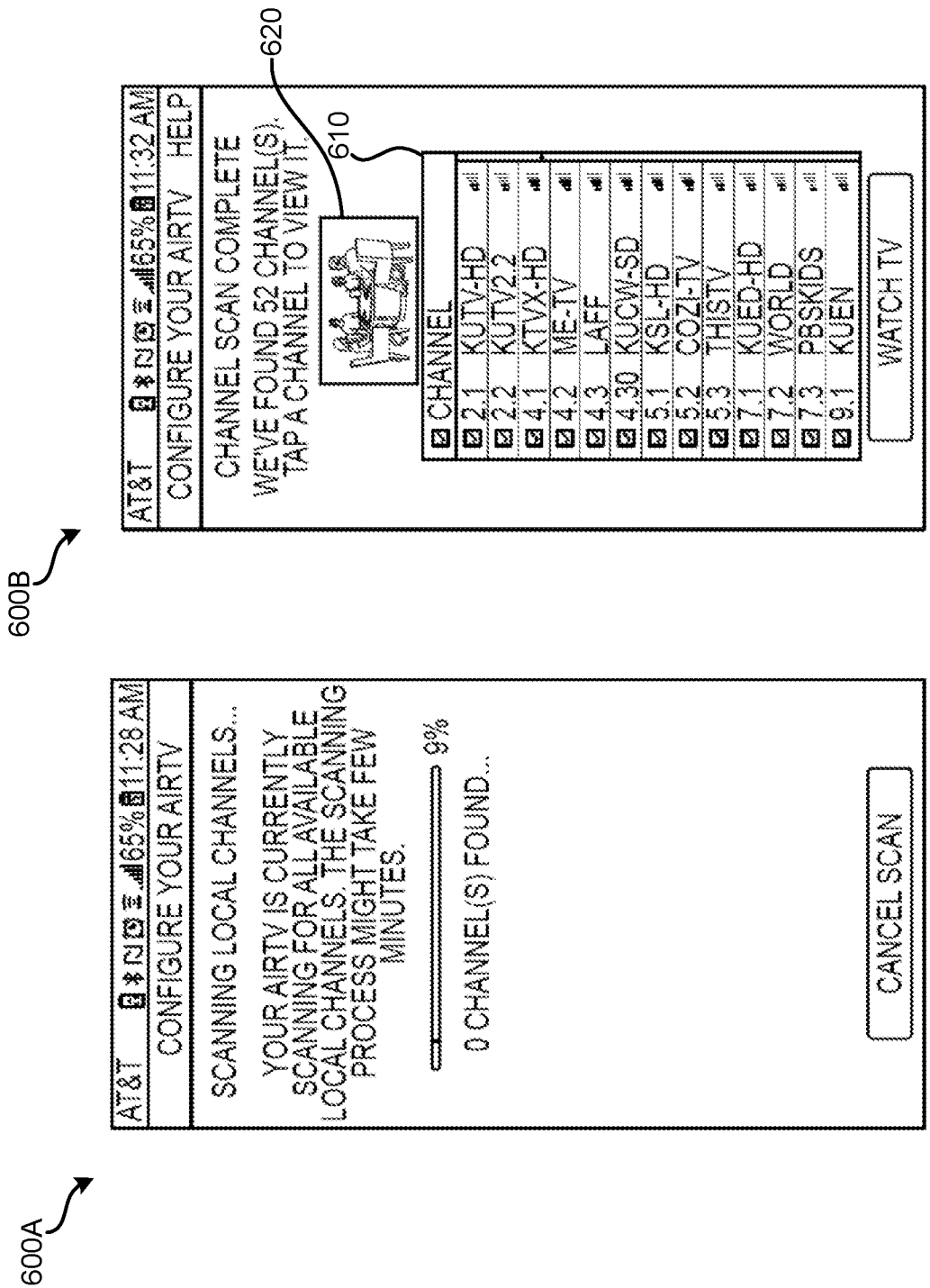
FIGS. 6A and 6B illustrate embodiments of an over the air (OTA) channel scanning setup process.

FIGS. 6A and 6B illustrate embodiments 600A and 600B of an over the air (OTA) channel scanning setup process. Embodiments 600A and 600B are interfaces presented on an end-user device, such as a smartphone. It should be understood that similar interfaces may be output for presentation by a bimodal DVR if the channel scanning setup process was initiated directly from the bimodal DVR. In the illustrated embodiments, a user has executed an application on an end-user device from which he then initiated the channel scanning setup process.

In embodiments 600A, a bimodal DVR linked with a same user account as the end-user device is instructed to search each possible available television channel accessible via the bimodal DVR's antenna port. In embodiment 600B, each television channel that can be received over the air with at least the threshold signal strength may be listed in interface 610. An indication of the channel number, television channel call sign, and signal strength may be indicated on interface 610. A live video feed 620 may be presented from a currently selected television channel of those listed in interface 610. A user may unselect any particular television channel that the user does not desire to have accessible for recording, viewing live, or being listed in an EPG via the end-user device or bimodal DVR. For example, the user may not desire to have home shopping channels made available for recording or viewing live. Only channels that are selected may be listed in an EPG presented by the end user device and/or bimodal DVR. Channels in the EPG may be intermingled with streaming television channels that are received from the cloud-based server. The cloud-based server system may store information that indicates which OTA television channels can be received and have been selected in association with the user account and/or bimodal DVR.

Figure 7:
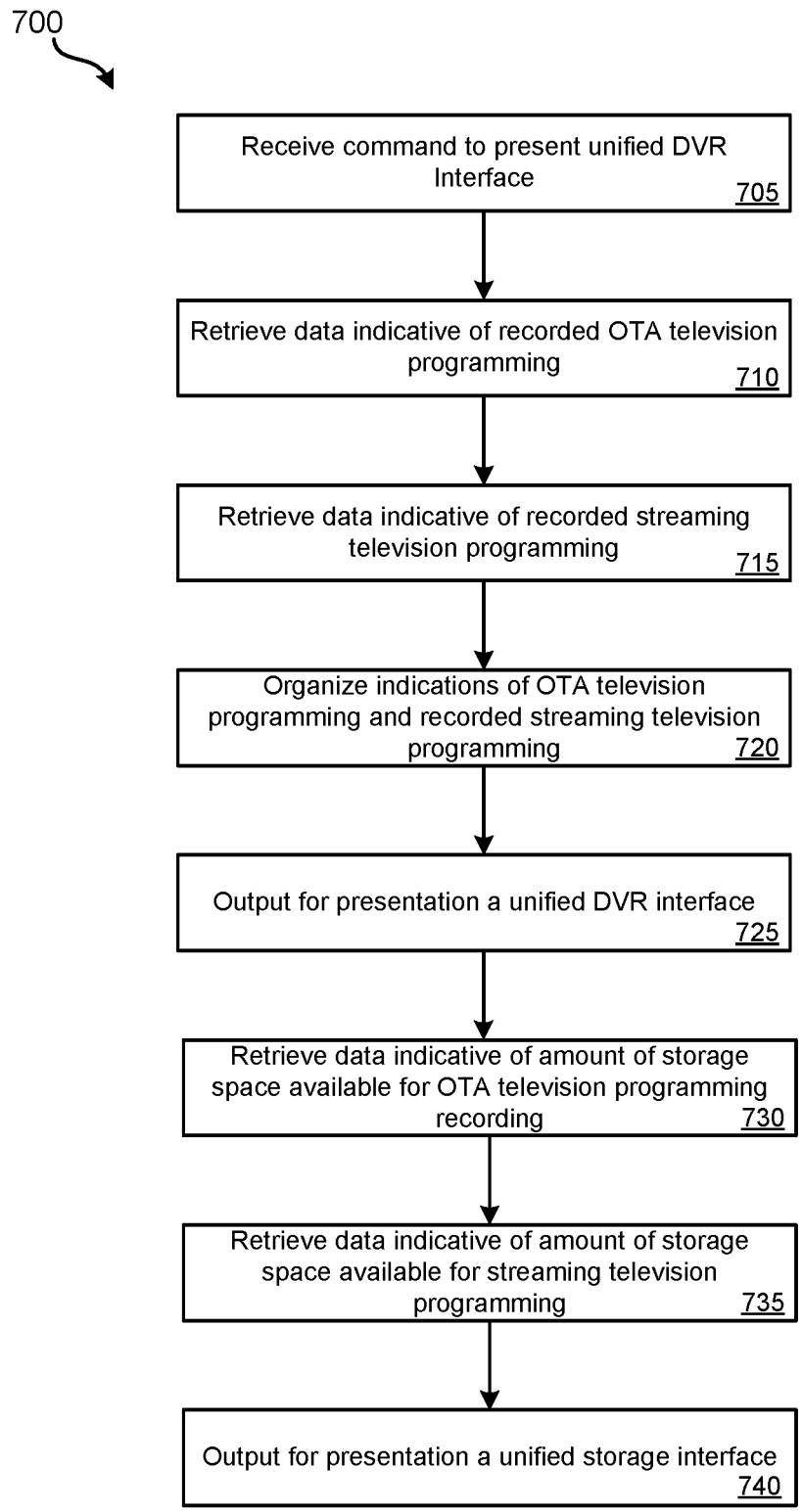
FIG. 7 illustrates an embodiment of a method for providing a bimodal DVR interface.

Various methods may be performed using the systems, devices, and interfaces detailed in relation to FIGS. 1-6. FIG. 7 illustrates an embodiment of a method 700 for providing a bimodal DVR interface. Method 700 may be performed using the systems and devices of FIGS. 1-4 and interface of FIG. 5. At block 705, user input may be received to present a unified DVR interface. This user input may be provided by the user to an end-user device or to a bimodal DVR that outputs video to display device, such as a television. In some embodiments, block 705 may involve a user causing the bimodal DVR or end-user device to execute an application and launch a unified DVR interface.

At block 710, data indicative of recorded OTA television programming may be retrieved. If block 705 was performed at a bimodal DVR, the bimodal DVR may access a local database to determine recorded OTA television programming that is stored locally. If block 705 was performed at an end-user device, the end-user device may transmit a request to the bimodal DVR and the bimodal DVR may respond with indications of recorded OTA television programming that is stored by the bimodal DVR. In other embodiments, the bimodal DVR may update a list of its OTA recordings stored remotely in the cloud by cloud-based television service provider system 110. The end user device may then retrieve this listing from the cloud in addition or in alternate to directly from the bimodal DVR.

If block 705 was performed at a bimodal DVR, the bimodal DVR may transmit a request to the cloud-based server system to retrieve indications of scheduled streaming television programming that was recorded from a streaming source by the cloud-based server in association with the same user account as is linked with the bimodal DVR. If block 705 was performed by an end-user device, the end-user device may transmit a request to the cloud-based server system to retrieve, at block 715, indications of streaming television programming that was recorded from streaming sources by the cloud-based server in association with the same user account as is linked with the end-user device. In some embodiments, the end-user device may send such a request to the bimodal DVR which may store indications of which streaming television programs have been recorded by the cloud-based server system in association with the user account. In some embodiments, indications of television programming stored by the cloud-based server system may be stored locally by the end-user device and/or the bimodal DVR.

At block 720, indications of recorded OTA television programming that is stored by the bimodal DVR and recorded streaming television programs that are stored by the cloud-based server system in association with the account may be organized for presentation by either the end-user device or the bimodal DVR. The OTA television programming and the scheduled streaming television programming may be organized according to some characteristic other than storage location or source from which the television programming was recorded. For instance, the two types of television programming may be intermingled and organized according to when they were recorded, alphabetically, or which television programs remain unwatched.

At block 725, a unified DVR interface may be output for presentation by either the end-user device or by the bimodal DVR. Within the unified DVR interface, indications of recorded television programs, both those recorded over the air and those recorded to the cloud-based server, may be presented as organized at block 720. An example of such a unified DVR interface is presented in FIG. 5.

At block 730, data may be retrieved by the bimodal DVR that indicates an amount of storage space locally available at the bimodal DVR for the recording of OTA television programming. At block 735, data may be retrieved indicative of an amount of space available for recording of streaming television programming at the cloud-based server. As part of the unified interface or as a separate unified storage interface, an indication of space available at both the bimodal DVR and the cloud-based server system in association with the user account may be presented simultaneously at block 740, such as illustrated in unified DVR interface 500. In some embodiments, in addition to or alternatively to indicating the amount of space available, the amount of space used at each location may be indicated.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for providing bimodal digital video recording, the method comprising:

performing, by a bimodal digital video recorder device, an over-the-air (OTA) set up process during which a determination that each OTA television of a plurality of OTA television channels are received each having at least a threshold signal strength via an antenna input port of the bimodal digital video recorder device;

recording, by the bimodal digital video recorder device, a plurality of OTA television programs of the plurality of OTA television channels received via the antenna input port of the bimodal digital video recorder device to a local processor-readable storage medium, wherein the plurality of OTA television channels were identified by performing the OTA set up process;

transmitting, by the bimodal digital video recorder device, a plurality of record instructions to a cloud-based television programming service provider server system to remotely record and store a plurality of scheduled streaming television programs to storage of the cloud-based television programming service provider server system;

receiving, by the bimodal digital video recorder device, user input requesting a bimodal digital video recorder (DVR) interface;

determining, by the bimodal digital video recorder device, the plurality of OTA television programs received via the antenna input port and recorded to the local processor-readable storage medium;

receiving, by the bimodal digital video recorder device, an indication of a first amount of storage space available at the cloud-based television programming service provider server system linked with a user account that is also linked with the bimodal digital video recorder device;

determining, by the bimodal digital video recorder device, a second amount of storage space available locally on the local processor-readable storage medium for storage of OTA television programs; and receiving, by the bimodal digital video recorder device, indications of the plurality of scheduled streaming television programs stored by the cloud-based television programming service provider server system; and outputting, by the bimodal digital video recorder device, data to a display device to present the bimodal DVR interface having a unified interface that simultaneously comprises:

indications of the plurality of recorded OTA television programs stored by the bimodal digital video recorder device;

indications of the plurality of scheduled streaming television programming stored by the cloud-based television programming service provider system that are mixed with the indications of the plurality of record OTA television programs;

a first graphical indicator indicative of the first amount of storage space available for recording scheduled streaming television programs at the cloud-based television programming service provider server system; and a second graphical indicator indicative of the second amount of storage space available for recording OTA television programs at the bimodal digital video recorder device.

2. The method for providing bimodal digital video recording of claim 1, further comprising:

organizing, by the bimodal digital video recorder device, the plurality of recorded OTA television programs and the plurality of scheduled streaming television programs according to a characteristic other than storage location or recording source, wherein at least some of the plurality of recorded OTA television programs are intermingled with at least some of the plurality of scheduled streaming television programs.

3. The method for providing bimodal digital video recording of claim 1, the method further comprising:

executing, by an end user display device, an application that communicates, via a wireless interface, with the bimodal digital video recorder device;

receiving, by the end user display device and the executed application, the data that indicates the plurality of recorded OTA television programs stored by the bimodal digital video recorder device and the plurality of scheduled streaming television programming stored by the cloud-based television programming service provider system; and presenting, by the executed application on a display of the end user display device, based on the received data, a second unified interface that simultaneously presents indications of the plurality of recorded OTA television programs stored by the bimodal digital video recorder device and indications of the plurality of scheduled streaming television programming stored by the cloud-based television programming service provider system.

4. The method for providing bimodal digital video recording of claim 3, further comprising:

receiving, by the application executed by the end user display device, a request to view a television program selected from the unified interface;

determining, by the bimodal digital video recorder device, that the television program indicated by the request is part of the plurality of OTA television programs stored to the local processor-readable storage medium; and streaming, by the bimodal digital video recorder device, the television program to the end user display device.

5. The method for providing bimodal digital video recording of claim 1 wherein the antenna input port wirelessly receives television programming from a wireless antenna transmitted device connected with an antenna.

6. The method for providing bimodal digital video recording of claim 1 wherein the antenna input port is a coaxial port that is connected with an over-the-air antenna via a coaxial cable.

7. The method for providing bimodal digital video recording of claim 1 wherein the antenna input port is an universal serial bus (USB) port that connects with a USB device having an integrated antenna.

8. A bimodal digital video recorder (DVR) system, comprising:

a cloud-based television programming service provider system that remotely records television programming for users linked with a plurality of user accounts; and a bimodal digital video recorder device, comprising:

an antenna input port that connects with an over-the-air antenna that receives television programming in VHF and/or UHF frequency bands;

a network interface that communicates with a cloud-based television programming service provider server system;

one or more processor-readable storage mediums having at least a portion of storage allocated for recording television programming; and one or more processors communicatively coupled with the one or more processor-readable storage mediums and the network interface, wherein the one or more processors are configured to execute instructions stored by the one or more processor-readable storage mediums that cause the one or more processors to:

perform an over-the-air (OTA) set up process during which a determination that each OTA television of a plurality of OTA television channels are received each having at least a threshold signal strength via the antenna input port of the bimodal digital video recorder device;

record OTA television programming of the plurality of OTA television channels received via the antenna input port to the one or more processor-readable storage mediums, wherein the plurality of OTA television channels were identified by performing the OTA set up process;

cause an instruction to be transmitted to the cloud-based television programming service provider server system to remotely record and store scheduled streaming television programming to a storage device of the cloud-based television programming service provider server system;

calculate a first amount of storage space available at the one or more processor-readable storage mediums of the bimodal DVR device for recording television programming;

receive an indication of a second amount of storage space available at the cloud-based television programming service provider system allocated to a user account that is registered with the bimodal DVR device; and output data to a display device to present a unified DVR interface that simultaneously comprises:

indications of recorded OTA television programming received by the bimodal DVR device via the antenna input port to the one or more processor-readable storage mediums;

indications of the scheduled streaming television programming stored by the cloud-based television programming service provider system;

a first graphical indicator indicative of the first amount of storage space available for recording OTA television programs at the bimodal digital video recorder device; and a second graphical indicator indicative of the second amount of storage space available for recording scheduled streaming television programs at the cloud-based television programming service provider server system.

9. The bimodal DVR system of claim 8 further comprising the over-the-air antenna.

10. The bimodal DVR system of claim 8, wherein the instructions, when executed, further cause the one or more processors to: output data to the display device that indicates, for each television program of a plurality of recorded television programs, whether the television program is: recorded OTA programming received by the bimodal DVR device via the antenna input port or scheduled streaming television programming stored by the cloud-based television programming service provider server system.

11. A bimodal digital video recorder (DVR) device, comprising:

an antenna input port that connects with an indoor or outdoor antenna that receives television programming in the VHF and/or UHF frequency bands;

a network interface that communicates with a cloud-based television programming service provider server system and end-user viewing devices;

one or more processor-readable storage mediums having at least a portion of storage allocated for recording television programming; and one or more processors communicatively coupled with the one or more processor-readable storage mediums and the network interface, wherein the one or more processors are configured to execute instructions stored by the one or more processor-readable storage mediums that cause the one or more processors to:

perform an over-the-air (OTA) set up process during which a determination that each OTA television of a plurality of OTA television channels are received each having at least a threshold signal strength via the antenna input port of the bimodal digital video recorder device;

record OTA television programming of the plurality of OTA television channels received via the antenna input port to the one or more processor-readable storage mediums, wherein the plurality of OTA television channels were identified by performing the OTA set up process;

calculate a first amount of storage space available at the one or more processor-readable storage mediums of the bimodal DVR device for recording television programming;

receive an indication of a second amount of storage space available at the cloud-based television programming service provider system allocated to a user account that is registered with the bimodal DVR device;

transmit an instruction to the cloud-based television programming service provider server system to remotely record and store scheduled streaming television programming to a storage device of the cloud-based television programming service provider server system; and output data to a display device to present a unified DVR interface that simultaneously comprises:

indications of recorded OTA television programming received by the bimodal DVR device via the antenna input port to the one or more processor-readable storage mediums;

indications of the scheduled streaming television programming stored by the cloud-based television programming service provider system;

a first graphical indicator indicative of the first amount of storage space available for recording OTA television programs at the bimodal digital video recorder device; and a second graphical indicator indicative of the second amount of storage space available for recording scheduled streaming television programs at the cloud-based television programming service provider server system.

12. The bimodal DVR device of claim 11, wherein the instructions, when executed, further cause the one or more processors to: output data to the display device that indicates, for each television program of a plurality of recorded television programs, whether the television program is: recorded OTA programming received by the bimodal DVR device via the antenna input port or scheduled streaming television programming stored by the cloud-based television programming server system.

13. The bimodal DVR device of claim 11, wherein the antenna input port wirelessly receives television programming from a wireless antenna transmitted device connected with the indoor or outdoor antenna.

14. The bimodal DVR device of claim 11, wherein the antenna input port is a coaxial port that is connected with the indoor or outdoor antenna via a coaxial cable.

15. The bimodal DVR device of claim 11, wherein the antenna input port is an universal serial bus (USB) port that connects with a USB device in which the indoor or outdoor antenna is integrated.

* * * * *